(12) United States Patent
Gelmetti et al.

(10) Patent No.: US 8,389,901 B1
(45) Date of Patent: Mar. 5, 2013

(54) WELDING WIRE GUIDING LINER

(75) Inventors: Carlo Gelmetti, Lazise (IT); Filippo Corradini, Isera (IT)

(73) Assignee: AWDS Technologies SRL (IT)

(*) Notice: Subject to any disclaimer, the term of this patent is extended or adjusted under 35 U.S.C. 154(b) by 288 days.

(21) Appl. No.: 12/789,095

(22) Filed: May 27, 2010

(51) Int. Cl.
B23K 9/28 (2006.01)
B23K 9/133 (2006.01)

(52) U.S. Cl. ............... 219/137.51; 219/76.14; 219/136; 219/137.9; 219/138; 242/615.2

(58) Field of Classification Search ............... 219/76.14, 219/136, 137.51, 137.9, 138; 242/615.2
See application file for complete search history.

(56) References Cited

U.S. PATENT DOCUMENTS

| | | | |
|---|---|---|---|
| 318,062 A | 5/1885 | Warren | |
| 532,565 A | 1/1895 | Kilmer | |
| 617,353 A | 1/1899 | Redmond | |
| 627,722 A | 6/1899 | Edwards | |
| 932,808 A | 8/1909 | Pelton | |
| 1,276,117 A | 8/1918 | Riebe | 464/171 |
| 1,468,994 A | 9/1923 | Cook | 206/393 |
| 1,640,368 A | 8/1927 | Obetz | |
| 1,907,051 A | 5/1933 | Emery | |
| 2,027,670 A | 1/1936 | Broeren | 312/62 |
| 2,027,674 A | 1/1936 | Broeren | 312/60 |
| 2,059,462 A | 11/1936 | Jungmann | |
| 2,329,369 A | 9/1943 | Haver | 285/11 |
| 2,407,746 A | 9/1946 | Johnson | |
| 2,457,910 A | 1/1949 | McLaren et al. | 74/501 |
| 2,477,059 A | 7/1949 | Hill | 242/137.1 |
| 2,483,760 A | 10/1949 | Duncan | 254/190 |
| 2,579,131 A | 12/1951 | Tinsley | 206/409 |
| 2,580,900 A | 1/1952 | Epstein | 206/409 |
| 2,694,130 A | 11/1954 | Howard | 219/8 |
| 2,713,938 A | 7/1955 | Snyder | |
| 2,724,538 A | 11/1955 | Schweich | |
| 2,838,922 A | 6/1958 | Gift | 66/125 R |
| 2,849,195 A | 8/1958 | Richardson | |
| 2,864,565 A | 12/1958 | Whearly | 242/128 |
| 2,869,719 A | 1/1959 | Hubbard | |
| 2,880,305 A | 3/1959 | Baird | |
| 2,911,166 A | 11/1959 | Haugwitz | 242/128 |
| 2,929,576 A | 3/1960 | Henning | |

(Continued)

FOREIGN PATENT DOCUMENTS

| | | |
|---|---|---|
| CN | 1466469 | 2/2004 |
| CN | 1626423 | 6/2005 |

(Continued)

OTHER PUBLICATIONS

U.S. Appl. No. 12/618,250, filed Nov. 13, 2009, Gelmetti et al.

(Continued)

Primary Examiner — Dao H Nguyen
(74) Attorney, Agent, or Firm — Hayes Soloway P.C.

(57) ABSTRACT

A welding wire guiding liner has a plurality of guiding bodies connected to each other, each of the guiding bodies containing a plurality of rolling elements defining a guiding channel for the welding wire. Each guiding body has a ring which is coaxial with the guiding channel and is freely rotatable in a peripheral direction on the body. The ring is connected to the adjacent guiding body by means of a swivel joint which allows the adjacent guiding body to swivel around a swivel axis with respect to the guiding body provided with the ring.

9 Claims, 6 Drawing Sheets

U.S. PATENT DOCUMENTS

| | | | |
|---|---|---|---|
| 2,966,258 A | 12/1960 | Krafft | |
| 2,974,850 A | 3/1961 | Mayer | |
| 2,984,596 A | 5/1961 | Franer | 206/412 |
| 3,096,951 A | 7/1963 | Jenson | 242/137.1 |
| 3,119,042 A | 1/1964 | Bond | |
| 3,185,185 A | 5/1965 | Pfund | |
| 3,244,347 A | 4/1966 | Jenk | |
| 3,274,850 A | 9/1966 | Tascio | 74/501 |
| 3,344,682 A | 10/1967 | Bratz | 74/501 |
| 3,352,412 A | 11/1967 | Draving et al. | 206/59 |
| 3,433,504 A | 3/1969 | Hanes | 285/93 |
| 3,463,416 A | 8/1969 | Quenot | 242/396.9 |
| 3,478,435 A | 11/1969 | Cook | |
| 3,491,876 A | 1/1970 | Zecchin | |
| 3,512,635 A | 5/1970 | Lang | |
| 3,565,129 A | 2/1971 | Field | |
| 3,567,900 A | 3/1971 | Nelson | |
| 3,576,966 A | 5/1971 | Sullivan | |
| 3,595,277 A | 7/1971 | Lefever | |
| 3,648,920 A | 3/1972 | Stump | |
| 3,724,249 A | 4/1973 | Asbeck et al. | |
| 3,729,092 A | 4/1973 | Marcell | |
| 3,730,136 A | 5/1973 | Okada | 118/78 |
| 3,799,215 A | 3/1974 | Willems | |
| 3,815,842 A | 6/1974 | Scrogin | 242/423.1 |
| 3,823,894 A | 7/1974 | Frederick et al. | 242/137.1 |
| 3,939,978 A | 2/1976 | Thomaswick | 206/454 |
| 4,043,331 A | 8/1977 | Martin et al. | 128/156 |
| 4,044,583 A | 8/1977 | Kinney, Jr. | |
| 4,074,105 A | 2/1978 | Minehisa et al. | |
| 4,097,004 A | 6/1978 | Reese | 242/129 |
| 4,102,483 A | 7/1978 | Ueyama et al. | |
| 4,113,795 A | 9/1978 | Izawa et al. | 524/84 |
| 4,127,590 A | 11/1978 | Endo et al. | 260/346.74 |
| 4,157,436 A | 6/1979 | Endo et al. | 528/167 |
| 4,161,248 A | 7/1979 | Kalmanovitch | 206/389 |
| 4,172,375 A | 10/1979 | Rushforth et al. | |
| 4,188,526 A | 2/1980 | Asano | |
| 4,222,535 A | 9/1980 | Hosbein | 242/128 |
| 4,254,322 A | 3/1981 | Asano | |
| 4,274,607 A | 6/1981 | Priest | 242/163 |
| 4,280,951 A | 7/1981 | Saito et al. | 524/118 |
| 4,293,103 A | 10/1981 | Tsukamoto | |
| 4,354,487 A | 10/1982 | Oczkowski et al. | 604/366 |
| 4,392,606 A | 7/1983 | Fremion | 206/600 |
| 4,396,797 A | 8/1983 | Sakuragi et al. | 174/68 |
| 4,429,001 A | 1/1984 | Kolpin et al. | 442/340 |
| 4,451,014 A | 5/1984 | Kitt et al. | 242/128 |
| 4,464,919 A | 8/1984 | Labbe | |
| 4,500,315 A | 2/1985 | Pieniak et al. | 604/379 |
| 4,540,225 A | 9/1985 | Johnson et al. | 339/16 RC |
| 4,546,631 A | 10/1985 | Eisinger | |
| 4,582,198 A | 4/1986 | Ditton | |
| 4,585,487 A | 4/1986 | Destree et al. | |
| 4,623,063 A | 11/1986 | Balkin | |
| 4,737,567 A | 4/1988 | Matsumoto et al. | 528/167 |
| 4,742,088 A | 5/1988 | Kim | 521/118 |
| 4,826,497 A | 5/1989 | Marcus et al. | 604/359 |
| 4,855,179 A | 8/1989 | Bourland et al. | 442/409 |
| 4,869,367 A | 9/1989 | Kawasaki et al. | 206/409 |
| 4,891,493 A | 1/1990 | Sato et al. | |
| 4,949,567 A | 8/1990 | Corbin | |
| 4,974,789 A | 12/1990 | Milburn | 242/159 |
| 5,051,539 A | 9/1991 | Leathers-Wiessner | |
| 5,061,259 A | 10/1991 | Goldman et al. | 604/368 |
| 5,078,269 A | 1/1992 | Dekko et al. | |
| 5,100,397 A | 3/1992 | Poccia et al. | 604/365 |
| 5,105,943 A | 4/1992 | Lesko et al. | |
| 5,109,983 A | 5/1992 | Malone et al. | |
| 5,147,646 A | 9/1992 | Graham | 424/424 |
| 5,201,419 A | 4/1993 | Hayes | 206/409 |
| 5,205,412 A | 4/1993 | Krieg | |
| 5,215,338 A | 6/1993 | Kimura et al. | 285/166 |
| 5,227,314 A | 7/1993 | Brown et al. | |
| 5,261,625 A | 11/1993 | Lanoue | 242/129.8 |
| 5,277,314 A | 1/1994 | Cooper et al. | 206/398 |
| 5,314,111 A | 5/1994 | Takaku et al. | |
| 5,368,245 A | 11/1994 | Fore | 242/171 |
| 5,372,269 A | 12/1994 | Sutton et al. | |
| 5,452,841 A | 9/1995 | Sibata et al. | |
| 5,485,968 A | 1/1996 | Fujioka | 242/172 |
| 5,494,160 A | 2/1996 | Gelmetti | 206/395 |
| 5,530,088 A | 6/1996 | Sheen et al. | 528/287 |
| 5,553,810 A | 9/1996 | Bobeczko | |
| 5,562,646 A | 10/1996 | Goldman et al. | 604/368 |
| 5,585,013 A | 12/1996 | Truty | 219/69.12 |
| 5,586,733 A | 12/1996 | Miura et al. | 242/125.2 |
| 5,590,848 A | 1/1997 | Shore et al. | |
| 5,629,377 A | 5/1997 | Burgert et al. | 524/832 |
| 5,665,801 A | 9/1997 | Chang et al. | 524/125 |
| 5,692,700 A | 12/1997 | Bobeczko | |
| 5,714,156 A | 2/1998 | Schmidt et al. | 424/404 |
| 5,738,209 A | 4/1998 | Burr et al. | 206/397 |
| 5,739,704 A | 4/1998 | Clark | |
| 5,746,380 A | 5/1998 | Chung | |
| 5,816,466 A | 10/1998 | Seufer | |
| 5,819,934 A | 10/1998 | Cooper | |
| 5,845,862 A | 12/1998 | Cipriani | 242/423.1 |
| 5,847,184 A | 12/1998 | Kleiner | 558/73 |
| 5,865,051 A | 2/1999 | Otzen et al. | |
| 5,921,391 A | 7/1999 | Ortiz et al. | 206/397 |
| 5,931,408 A | 8/1999 | Ishii et al. | 242/580 |
| 5,971,308 A | 10/1999 | Boulton | |
| 5,988,370 A | 11/1999 | Roemer et al. | 206/215 |
| 5,990,377 A | 11/1999 | Chen et al. | 604/381 |
| 6,016,911 A | 1/2000 | Chen | 200/395 |
| 6,019,303 A | 2/2000 | Cooper | |
| 6,103,358 A | 8/2000 | Bruggemann et al. | 428/317.9 |
| 6,159,591 A | 12/2000 | Beihoffer et al. | 428/327 |
| 6,237,768 B1 | 5/2001 | Cipriani | |
| 6,245,880 B1 | 6/2001 | Takeuchi et al. | 528/287 |
| 6,255,371 B1 | 7/2001 | Schlosser et al. | 524/100 |
| 6,260,781 B1 | 7/2001 | Cooper | |
| 6,301,944 B1 | 10/2001 | Offer | |
| 6,322,016 B1 | 11/2001 | Jacobsson et al. | |
| 6,340,522 B1 | 1/2002 | Burke et al. | |
| 6,408,888 B1 | 6/2002 | Baumer et al. | 138/120 |
| 6,417,425 B1 | 7/2002 | Whitmore et al. | 604/367 |
| 6,425,549 B1 | 7/2002 | Bae et al. | 242/580 |
| 6,441,067 B1 | 8/2002 | Chiu et al. | 524/117 |
| 6,464,077 B1 | 10/2002 | Liu | |
| 6,498,227 B1 | 12/2002 | Horie | 528/176 |
| 6,547,176 B1 | 4/2003 | Blain et al. | 242/423.1 |
| 6,564,943 B2 | 5/2003 | Barton et al. | 206/395 |
| 6,613,848 B1 | 9/2003 | Wang et al. | 525/481 |
| 6,636,776 B1 | 10/2003 | Barton et al. | |
| 6,648,141 B2 | 11/2003 | Land | |
| 6,649,870 B1 | 11/2003 | Barton et al. | |
| 6,708,864 B2 | 3/2004 | Ferguson, III et al. | |
| 6,715,608 B1 | 4/2004 | Moore | 206/397 |
| 6,745,899 B1 | 6/2004 | Barton | |
| 6,749,139 B2 | 6/2004 | Speck | |
| 6,750,262 B1 | 6/2004 | Hahnle et al. | 521/64 |
| 6,753,454 B1 | 6/2004 | Smith et al. | 602/41 |
| 6,821,454 B2 | 11/2004 | Visca et al. | |
| 6,831,142 B2 | 12/2004 | Mertens et al. | 526/328.5 |
| 6,872,275 B2 | 3/2005 | Ko et al. | 156/181 |
| 6,889,835 B2 | 5/2005 | Land | 206/408 |
| 6,913,145 B2 | 7/2005 | Barton | 206/409 |
| 6,938,767 B2 | 9/2005 | Gelmetti | 206/408 |
| 6,977,357 B2 | 12/2005 | Hsu et al. | |
| 7,004,318 B2 | 2/2006 | Barton | 206/409 |
| 7,108,916 B2 | 9/2006 | Ehrnsperger et al. | 428/403 |
| 7,147,176 B2 | 12/2006 | Rexhaj | |
| 7,152,735 B2 | 12/2006 | Dragoo et al. | |
| 7,156,334 B1 | 1/2007 | Fore et al. | 242/171 |
| 7,178,755 B2 | 2/2007 | Hsu et al. | 242/423.1 |
| 7,198,152 B2 | 4/2007 | Barton et al. | |
| 7,220,942 B2 | 5/2007 | Barton et al. | |
| 7,309,038 B2 | 12/2007 | Carroscia | 206/409 |
| 7,377,388 B2 | 5/2008 | Hsu et al. | 206/389 |
| 7,410,111 B2 | 8/2008 | Carroscia | |
| 7,441,657 B2 | 10/2008 | Gelmetti | 206/393 |
| 7,441,721 B2 | 10/2008 | Bae et al. | 242/128 |
| 7,533,906 B2 | 5/2009 | Luettgen et al. | 285/146.1 |
| 7,563,840 B2 | 7/2009 | Ye | 524/449 |
| 7,950,523 B2 | 5/2011 | Gelmetti | 206/408 |

| | | | | | | |
|---|---|---|---|---|---|---|
| 2001/0014706 | A1 | 8/2001 | Sprenger et al. ............. 523/400 | EP | 2 168 706 | 3/2010 |
| 2002/0000391 | A1 | 1/2002 | Kawasai et al. ............. 206/408 | EP | 2 286 950 | 2/2011 |
| 2002/0003014 | A1 | 1/2002 | Homma | FR | 1215111 | 4/1960 |
| 2002/0014477 | A1 | 2/2002 | Lee et al. | FR | 2055181 | 5/1971 |
| 2002/0039869 | A1 | 4/2002 | Achille ........................ 442/417 | FR | 2595674 | 3/1988 |
| 2002/0120178 | A1 | 8/2002 | Tartaglia et al. ............. 600/114 | FR | 2 888 825 | 1/2007 |
| 2003/0042162 | A1 | 3/2003 | Land ............................ 206/408 | GB | 880502 | 10/1961 |
| 2003/0042163 | A1 | 3/2003 | Cipriant | GB | 1168928 | 10/1969 |
| 2003/0052030 | A1 | 3/2003 | Gelmetti ...................... 206/397 | GB | 1229913 | 4/1971 |
| 2003/0184086 | A1 | 10/2003 | Christianson ............. 285/146.1 | GB | 1 575 157 | 9/1980 |
| 2004/0020041 | A1 | 2/2004 | Ferguson, III et al. | GB | 2059462 | 4/1981 |
| 2004/0050441 | A1 | 3/2004 | Roschi ........................ 138/120 | GB | 2 332 451 | 6/1999 |
| 2004/0133176 | A1 | 7/2004 | Muthiah et al. ............. 604/368 | JP | 49-13065 | 2/1974 |
| 2004/0155090 | A1 | 8/2004 | B.-Jensen | JP | 54-035842 | 3/1979 |
| 2004/0176557 | A1 | 9/2004 | Mertens et al. ............ 526/328.5 | JP | 54-043856 | 4/1979 |
| 2004/0186244 | A1 | 9/2004 | Hatsuda et al. ............. 525/451 | JP | 55-054295 | 4/1980 |
| 2004/0201117 | A1 | 10/2004 | Anderson ...................... 264/4.3 | JP | 55-156694 | 12/1980 |
| 2004/0241333 | A1 | 12/2004 | Cielenski et al. .......... 427/421.1 | JP | 56-023376 | 3/1981 |
| 2004/0265387 | A1 | 12/2004 | Hermeling et al. ........... 424/486 | JP | 57-102471 | 6/1982 |
| 2005/0008776 | A1 | 1/2005 | Chhabra et al. ............. 427/180 | JP | 58-035068 | 3/1983 |
| 2005/0261461 | A1 | 11/2005 | Maeda et al. ............. 528/272 | JP | 58-70384 | 5/1983 |
| 2006/0027699 | A1 | 2/2006 | Bae et al. | JP | 59-197386 | 11/1984 |
| 2006/0074154 | A1 | 4/2006 | Harashina et al. ........... 524/115 | JP | 59-229287 | 12/1984 |
| 2006/0155254 | A1 | 7/2006 | Sanz et al. .................... 604/378 | JP | 59-232669 | 12/1984 |
| 2006/0247343 | A1 | 11/2006 | Kishimoto et al. ........... 524/117 | JP | 60-021181 | 2/1985 |
| 2006/0258824 | A1 | 11/2006 | Oshima et al. ............. 525/533 | JP | 60-032281 | 2/1985 |
| 2006/0278747 | A1 | 12/2006 | Carroscia | JP | 60-082275 | 5/1985 |
| 2007/0175786 | A1 | 8/2007 | Nicklas | JP | 60-082276 | 5/1985 |
| 2007/0272573 | A1 | 11/2007 | Gelmetti | JP | 60-184422 | 9/1985 |
| 2007/0284354 | A1 | 12/2007 | Laymon ................... 219/137.51 | JP | 60-223664 | 11/1985 |
| 2008/0156925 | A1 | 7/2008 | Cooper ..................... 242/559.3 | JP | 61-162541 A | 7/1986 |
| 2008/0257875 | A1 | 10/2008 | De Keizer ................ 219/137.44 | JP | 61-293674 | 12/1986 |
| 2008/0300349 | A1 | 12/2008 | Fuchikami et al. ........... 524/117 | JP | 62-009774 | 1/1987 |
| 2009/0014572 | A1 | 1/2009 | Weissbrod et al. | JP | 62-111672 | 5/1987 |
| 2009/0014579 | A1 | 1/2009 | Bender et al. | JP | 62-287055 | 12/1987 |
| 2009/0200284 | A1* | 8/2009 | Sanchez ................... 219/137.51 | JP | 63-147781 | 6/1988 |
| 2010/0116803 | A1* | 5/2010 | Gelmetti ...................... 219/138 | JP | 1-65265 | 4/1989 |
| 2011/0073703 | A1* | 3/2011 | Gelmetti et al. .......... 242/615.2 | JP | 1-240222 | 9/1989 |
| 2011/0094911 | A1 | 4/2011 | Gelmetti ...................... 206/408 | JP | 3-264169 | 11/1991 |
| 2011/0114523 | A1 | 5/2011 | Gelmetti ...................... 206/407 | JP | 03264169 A | 11/1991 |
| 2011/0114617 | A1* | 5/2011 | Gelmetti et al. .......... 219/137.9 | JP | 4-112169 | 4/1992 |
| 2011/0132880 | A1* | 6/2011 | Kossowan ................ 219/76.14 | JP | 04-133973 | 5/1992 |
| | | | | JP | 4-274875 | 9/1992 |
| | | | | JP | 5-178538 | 7/1993 |
| | | FOREIGN PATENT DOCUMENTS | | JP | 7-247058 | 9/1995 |
| | | | | JP | 8-40642 | 2/1996 |
| DE | | 1011840 B | 7/1957 | JP | 08-150492 | 6/1996 |
| DE | | 1082215 | 11/1957 | JP | 08-267274 | 10/1996 |
| DE | | 1 154 624 | 8/1960 | JP | 2000-202630 | 7/2000 |
| DE | | 2122958 | 11/1972 | JP | 2000-225468 | 8/2000 |
| DE | | 2 148 348 | 4/1973 | JP | 2000-263239 | 9/2000 |
| DE | | 2202177 | 7/1973 | JP | 2001-26375 | 1/2001 |
| DE | | 2525938 | 12/1976 | JP | 2001-150187 | 6/2001 |
| DE | | 26 46 218 | 4/1977 | JP | 2001-323268 A | 11/2001 |
| DE | | 28 16 100 | 10/1978 | JP | 2004-025242 | 1/2004 |
| DE | | 36 09 839 | 10/1989 | JP | 2004-025243 | 1/2004 |
| DE | | 19909214 | 3/1999 | JP | 2005-169499 | 6/2005 |
| DE | | 19958697 | 6/1999 | JP | 2007-927 | 1/2007 |
| DE | | 199 10 128 | 4/2001 | JP | 2007-29971 | 2/2007 |
| DE | | 100 06 592 | 8/2001 | KR | 2002-0077857 | 10/2002 |
| DE | | 10202839 | 1/2002 | RU | 793678 | 1/1981 |
| DE | | 103 60 466 | 7/2005 | RU | 1412830 | 7/1988 |
| DE | | 102007015946 | 10/2008 | WO | WO 81/03319 | 11/1981 |
| EP | | 2 267 255 | 4/1974 | WO | WO 8810230 | 12/1988 |
| EP | | 0408259 | 4/1992 | WO | WO 94-00493 | 1/1994 |
| EP | | 0519424 A1 | 12/1992 | WO | WO 94-19258 | 9/1994 |
| EP | | 2 264 482 | 9/1993 | WO | WO 97/00878 | 1/1997 |
| EP | | 584056 | 2/1994 | WO | WO 98/52844 | 11/1998 |
| EP | | 0665 166 | 1/1995 | WO | WO 00-50197 | 8/2000 |
| EP | | 0686439 A1 | 12/1995 | WO | WO 01/27365 | 4/2001 |
| EP | | 0806429 | 11/1997 | WO | WO 02/094493 | 11/2002 |
| EP | | 1057751 A1 | 12/2000 | WO | WO 03-106096 A1 | 12/2003 |
| EP | | 1 070 754 | 1/2001 | WO | WO 2005/005704 | 1/2005 |
| EP | | 1 275 595 | 1/2003 | WO | WO 2005/061168 | 7/2005 |
| EP | | 1 295 813 | 3/2003 | WO | WO2006091075 | 8/2006 |
| EP | | 1 471 024 | 10/2004 | WO | WO 2007/010171 | 1/2007 |
| EP | | 1 698 421 | 6/2006 | WO | WO 2007/112972 | 10/2007 |
| EP | | 1 974 846 | 1/2008 | | | |
| EP | | 2 256 064 | 1/2010 | | | |

| WO | WO 2007/149689 | 12/2007 |
| WO | WO 2009/007845 | 1/2009 |
| WO | WO 2009/143917 | 3/2009 |

OTHER PUBLICATIONS

Office Action issued for related U.S. Appl. No. 12/618,250, dated Apr. 26, 2012 (11 pgs).
"International Plastics Flammability Handbook" Jurgen Troitzsch, $2^{nd}$ edition, 1990, pp. 33, 43-49 and 59.
Chinese Official Action dated Mar. 17, 2010.
EPO Office Action issued for related application No. 09753572.8, dated May 2, 2012 (5 pgs).
European Office Action for corresponding application No. 10 014 553.1-2302, dated Apr. 3, 2012 (4 pgs).
European Office Action issued for 09777298.2, dated Aug. 31, 2012 (4 pgs).
European Search Report, dated Mar. 2, 2011 (7 pgs).
European Search Report, dated Sep. 17, 2008.
Hansen et al., "Water Absorption and Mechanical Properties of Electrospun Structured Hydrogels", Journal of Applied Polymer Science, vol. 95, pp. 427-434 (2005).
International Preliminary Report on Patentability issued for related application No. PCT/EP2009/001285, dated Nov. 30, 2010 (7 pgs).
International Preliminary Report on Patentability, dated Sep. 16, 2010 (5 pgs).
International Preliminary Report, PCT/IPEA/409, 7 pages.
International Search Report and Written Opinion issued in corresponding PCT Appln. No. PCT/EP2009/005246, dated Apr. 6, 2010 (9 pgs).
International Search Report issued in Applicants' underlying PCT Application Serial No. PCT/EP09/001285, dated Feb. 24, 2009 (3 pgs).
International Search Report, dated Jul. 6, 2009 (3 pgs).
Korean Official Action dated May 16, 2011, Appln. No. 2008-7005433, (3 pgs).
PCT International Search Report, dated Nov. 6, 2008.
Plaza et al., Preparation of ethylenebis(nitrilodimethylene)tetrakis(phenylphosphinic acid), Inorganic Synthesis, vol. 16, No. 199, abstract, one page.
Search Report received in Applicant's counterpart European Patent Application Serial No. 08017572.2-2302.
Search Report received in Applicant's counterpart European Patent Application Serial No. 10014216.5-1256 (8 pages), dated Apr. 14, 2011.
Search Report received in Applicant's counterpart European Patent Application Serial No. 110008927-2302 (8 pages), dated Jul. 19, 2011.
Search Report received in Applicant's counterpart European Patent Application Serial No. 11000236.7 (8 pages), dated Aug. 4, 2011.
Ullmanns Encyclopedia of Industrial Chemistry, Sulfuric Acid & Sulfur Trioxide to Tetrahydrofuran, Superabsorbents, $6^{th}$ Edition, vol. 35, pps. 73, 80, 86 and 89 (2003).
US Official Action dated Feb. 13, 2012, issued in U.S. Appl. No. 12/917,320 (14 pgs).

* cited by examiner

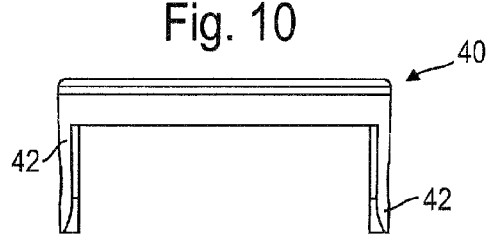
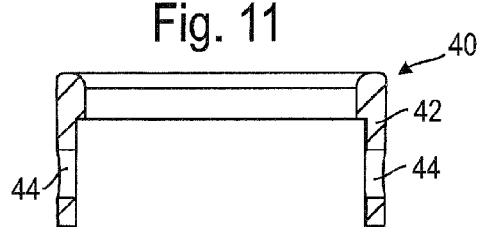
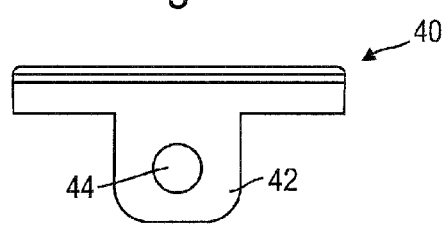
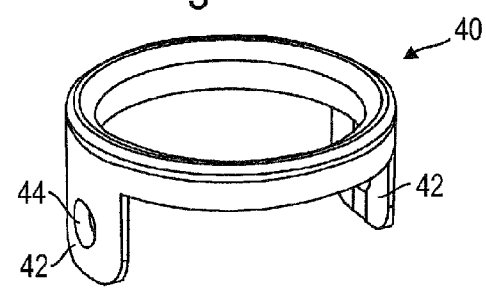
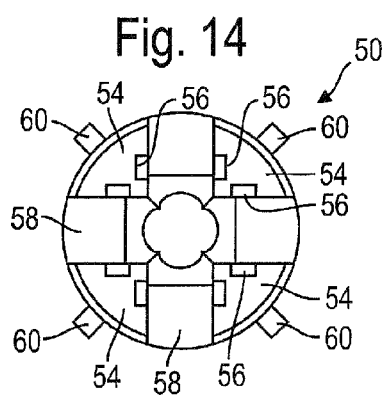
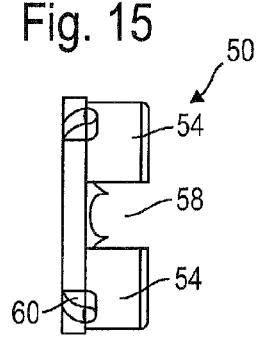
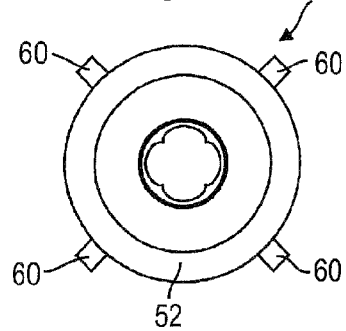
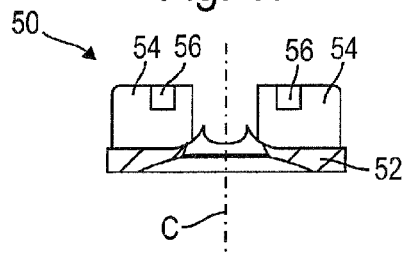
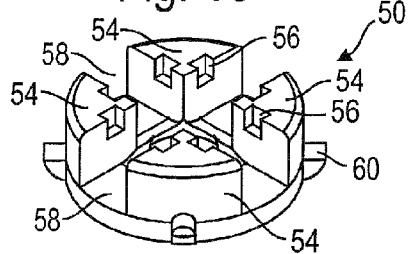

WELDING WIRE GUIDING LINER

The invention relates to a liner for guiding welding wire with low friction.

BACKGROUND OF THE INVENTION

The use of welding automated processes in many industrial applications is increasingly growing. It is common practice for such technology to feed welding wires, sometimes at significantly high speed, from large bulk containers holding up to 1000 kgs of welding consumable, from the container to the wire feeder and subsequently from the wire feeder to the welding torch.

There are some general technical problems involved when welding wire is being fed over large distances. One issue is attrition which causes the welding wire to be fed intermittently and inconsistently, with consequent spatter and in most extreme cases, torch tip burn backs. Another issue is wire surface contamination. When a large quantity of welding wire is being fed through a liner, the drawing residues and lubricant which are normally present on the wire surface as a consequence of the wire drawing process, accumulate in the liner. Further, it must be ensured that there is no excessive wire deformation and cast bending which would result in the wire being fed deformed to the welding torch, with consequent unreliable weld placements. Finally, wire surface scratching must be prevented, as otherwise the copper coating would be scraped off the wire surface which would result in inconsistent bad electrical contact at the torch tip.

There are some welding wire guides which aim at solving these issues. One example can be found in FR 2 888 825 A1 which discloses a welding wire guide which consists of two guiding bodies placed in an alternating pattern. In a first guiding body, a first set of rolling elements is arranged which guide the welding wire in a first direction. In the second guiding body, a second set of rolling elements is provided which guide the welding wire in a second direction. It is only the combination of a first and a second guiding body which defines a complete guiding channel for the welding wire. As the first set of rolling elements is spaced from the second set of rolling elements, the welding wire can touch the guiding bodies when the guiding liner is curved, resulting in increased friction and wear.

WO 2009/143917 A1 discloses a welding wire liner which consists of a plurality of liner bodies connected to each other by means of a pivot connection. Each liner body comprises a set of rolling elements which guide the wire without friction.

EP 1 974 846 A2 discloses a welding wire liner which consists of a plurality of liner bodies connected to each other by means of a ball joint. This allows the bodies to swivel in any direction with respect to the previous body. Further, the bodies can be rotated with respect to each other, which allows using the liner for feeding the welding wire to a welding torch. In view of the particular configuration of the joints between adjacent liner bodies, the ability of withstanding torsional loads has proven to be limited. Modern multiple axis welding robots move in all directions and rotate the welding torch in some cases more than 360° and must be capable of doing so without any restriction. This movement results in tension being built up, caused by the swift and sharp movements in all directions which eventually causes the wire guiding liner assemblies to snap and break apart. If the wire guiding liner is tensioned by the robot movements and cannot adequately and quickly stretch out to follow and match the robot arm rapid movements, it represents an obstacle to the continuous and correct robot performance and in most cases, when damaged, it requires the welding operator to either repair or replace it, with unwanted costly stops and losses of production.

Our earlier patent application U.S. Ser. No. 12/618,250 addresses the issue of torsional loads by using swivel connections at discrete intervals along the liner. These swivel connections allow to discharge any tension which might have resulted from the movements of the welding torch to which the liner is fitted. However, each swivel connection forms an interruption of the guiding liner.

The object of the invention is to provide a welding wire guiding liner which fulfills the requirements regarding a reliable, smooth and low-friction guiding of the welding wire, and in addition allows rotational movements of a welding torch without creating excessive torsional loads in the liner.

BRIEF DESCRIPTION OF THE INVENTION

In order to achieve the above objects, a welding wire guiding liner is provided which has a plurality of guiding bodies connected to each other. Each of the guiding bodies contains a plurality of rolling elements defining a guiding channel for the welding wire. Each guiding body has a ring which is coaxial with the guiding channel and is freely rotatable in a peripheral direction on the body. The ring is connected to the adjacent guiding body by means of a swivel joint which allows the adjacent guiding body to swivel around a swivel axis with respect to the guiding body provided with the ring. This liner is based on the idea of combining the articulation between adjacent guiding bodies with the freedom of rotation between adjacent guiding bodies. A simple mechanical element is sufficient for achieving articulation and rotation, namely the ring which forms a swivel joint with the adjacent guiding body while being rotatably arranged on "its" guiding body.

According to a preferred embodiment, the swivel joint is formed by two connecting lugs on the ring which each have an opening into which swivel studs engage which are provided on the adjacent guiding body. This results in a reliable mechanical connection which can be easily assembled.

Preferably, each of the guiding bodies is provided with a peripheral groove which accommodates the ring. The groove is a simple means for holding the ring in a manner which allows rotation while preventing the ring from becoming disengaged from the guiding body.

According a preferred embodiment, each of the guiding bodies is provided with a holding element which accommodates the rolling elements, and a cover element in the interior of which the holding element is placed. This allows to assemble the liner with very few steps by placing the rolling elements in the holding element and then placing the cover element over the holding element whereby the rolling elements are fixed in their position in the holding element.

Preferably, the cover element has a skirt which is provided with a plurality of slots extending in parallel with the guiding channel in the interior of the guiding body, and an enlarged rim portion behind which the ring is placed. The slots allow the skirt to elastically shrink when the ring is pushed over the enlarged rim and to return to the previous condition, thereby fixing the ring on the skirt.

Preferably, the holding element is placed within the skirt so as to support the skirt in a radial direction. This prevents that the skirt unintentionally shrinks or collapses when high loads act on the ring, thereby preventing the ring from becoming detached from the skirt.

According to a preferred embodiment, an elastic ring is provided between adjacent guiding bodies. The elastic ring keeps the liner in a stretched condition which facilitates inserting the welding wire.

Preferably, each guiding body is provided with an accommodation groove for the elastic ring at one end face and an abutment surface at the opposite end face. The groove ensures that the ring is maintained at its proper location without additional measures being necessary.

The welding wire guiding liner can be provided with an outer protective hose which is made from a flexible material selected from a group comprising rubber, EPDM, silicon, cloth, polyamide, and aramid fibers. This prevents that dirt and other contamination can enter the guiding channel for the welding wire.

BRIEF DESCRIPTION OF THE DRAWINGS

The invention will now be explained in detail with reference to the enclosed drawings. In the drawings.

FIG. 10 shows a ring used in the liner of FIG. 2 in a side view;

FIG. 11 shows the ring of FIG. 10 in a sectional view;

FIG. 12 shows the ring in another side view;

FIG. 13 shows the ring in a perspective view;

FIG. 14 shows a holding element used in the liner of FIG. 2 in a top view;

FIG. 15 shows the holding element of FIG. 14 in a side view;

FIG. 16 shows the holding element in a bottom view;

FIG. 17 shows the holding element in a sectional view;

FIG. 18 shows the holding element in a perspective view;

DETAILED DESCRIPTION OF THE INVENTION

Figure 1:
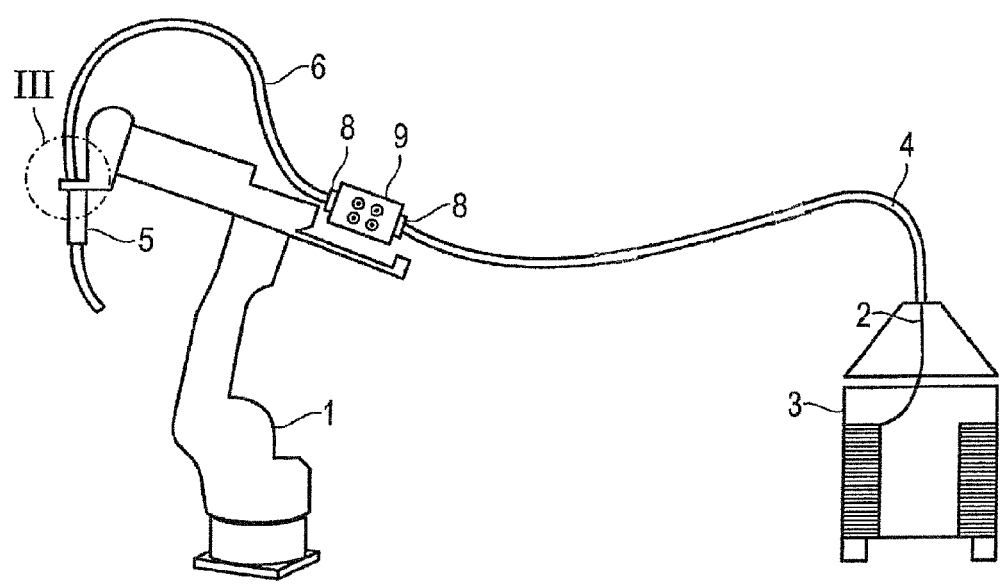
FIG. 1 shows a general, schematic view of the liner used for guiding welding wire to and in a welding robot.
Figure 2:
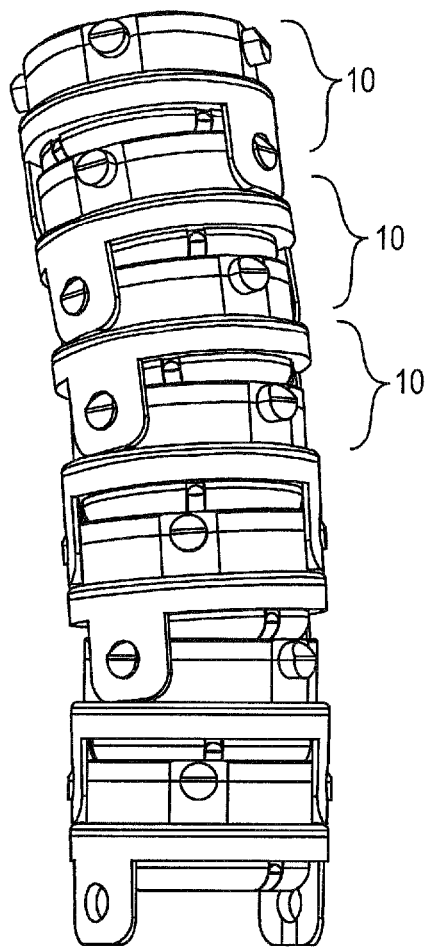
FIG. 2 shows a perspective view of the liner.
Figure 3:
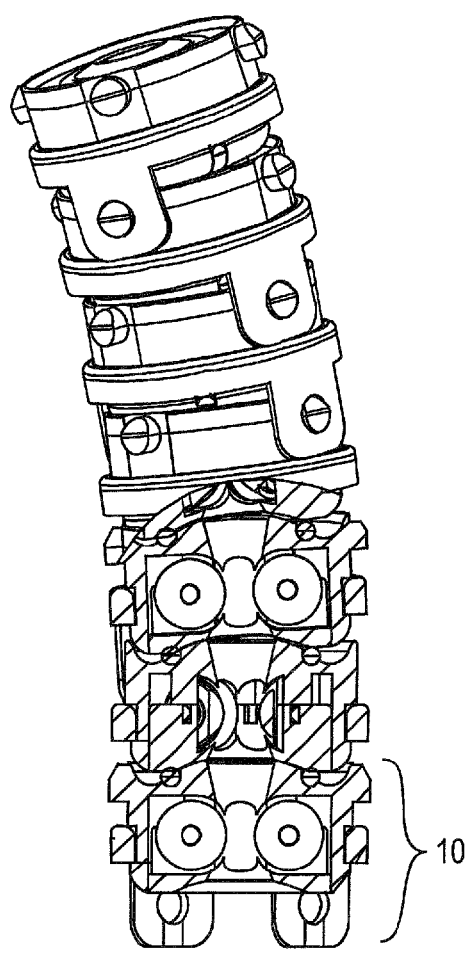
FIG. 3 shows another, partially cut view of the liner shown in FIG. 2.
Figure 4:
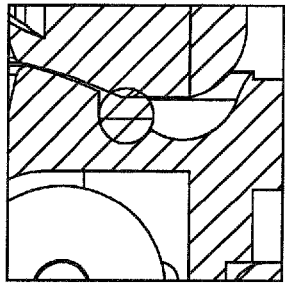
FIG. 4 shows in an enlarged scale detail IV of FIG. 3.
Figure 5:
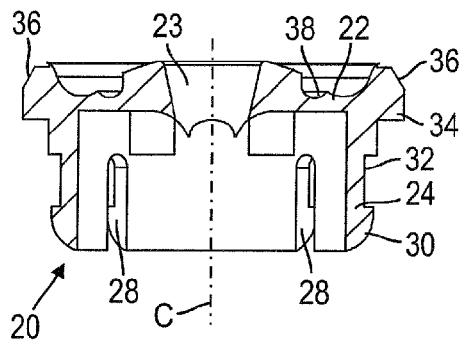
FIG. 5 shows a cover element used in the liner of FIG. 2 in a sectional view.
Figure 6:
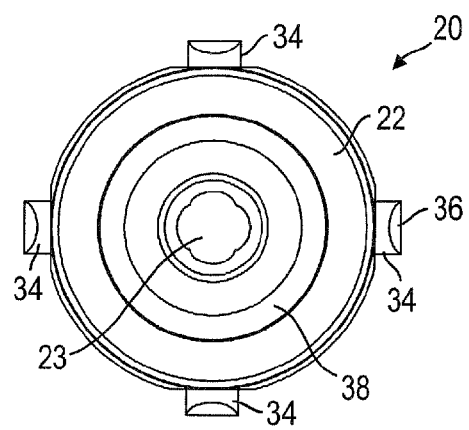
FIG. 6 shows the cover element of FIG. 5 in a top view.
Figure 7:
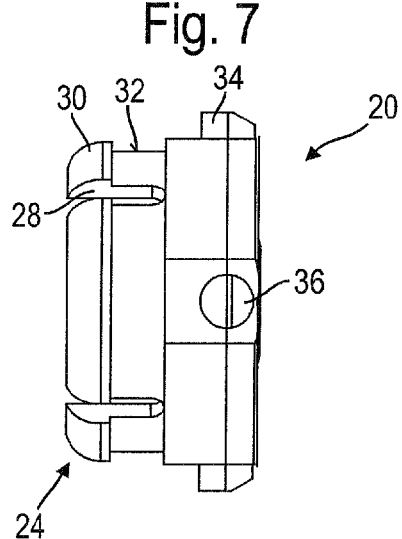
FIG. 7 shows the cover element in a side view.
Figure 8:
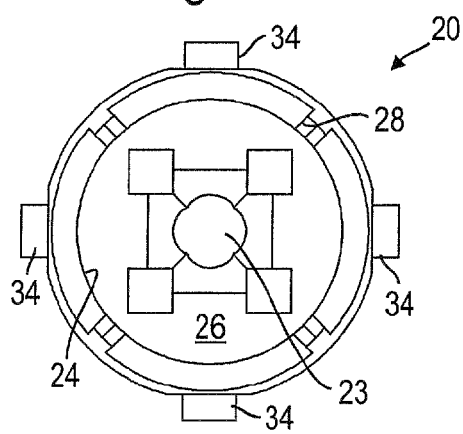
FIG. 8 shows the cover element in a bottom view.
Figure 9:
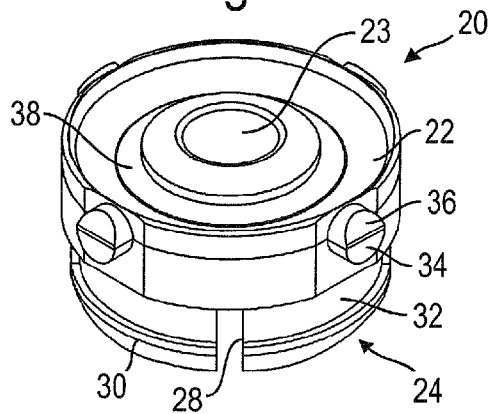
FIG. 9 shows the cover element in a perspective view.

In FIG. 1, a welding robot 1 is schematically shown, which is supplied with welding wire 2 from a container 3. Welding wire container 3 is situated in a distance from welding robot 1 at a place which is easily accessible with for example a fork lift. In order to guide welding wire 2 with low friction from container 3 to welding robot 1, a welding wire guiding liner 4 is provided which is used for guiding the welding wire from the container towards welding robot 1 and to a certain point on the welding robot, e.g. to a wire feeder 9. From this point toward a welding torch 5, a second welding wire guiding liner 6 is used. At the place where liner segment 4 is connected to welding robot 1, a termination 8 is used. Along the welding robot, the welding wire guide 6 is used which extends from a termination 8 at wire feeder 9 to a place close to welding torch 5. At the wire feeder 9, electric current, gas, etc. can be introduced into liner 6.

The liner is composed of a plurality of guiding bodies 10 (please see in particular FIGS. 2, 3 and 29, 30) which in turn each comprises a cover element 20 (please see in particular FIGS. 5 to 9), a ring 40 (please see in particular FIGS. 10 to 13) and a holding element 50 (please see in particular FIGS. 14 to 18).

Cover element 20 is generally cup-like with a generally circular plate 22 having a central opening 23, and a generally cylindrical skirt 24 which extends from plate 22. Skirt 24 defines an inner accommodation space 26 in which holding element 50 can be placed. At regularly spaced intervals, skirt 24 is provided with slots 28 which extend from the free end of skirt 24 towards plate 22, but which end at a distance before plate 24. Furthermore, skirt 24 is provided with an enlarged rim portion 30 so that a groove 32 is formed which extends around the entire skirt 24. The side of rim portion 30 which faces away from plate 22 is formed with a smooth, rounded contour (please see in particular FIG. 5).

Groove 32 is defined in the side opposite rim portion 30 by an enlarged base portion of skirt 24, with which the skirt merges into plate 22. As can be seen in particular in FIG. 7, slots 28 extend over the entire rim portion 30 and through groove 32, but end at the side of the groove which is oriented towards plate 22. Slots 28 confer to skirt 24 a certain elasticity as it allows the individual segments of the skirt to deflect inwardly.

Plate 22 is provided with four swivel studs 34 which are equally distributed around the perimeter of cover element 20. Seen in a radial direction, each swivel stud 34 has a circular cross-section (please see in particular FIG. 7). On the side facing away from rim portion 30, each swivel stud 34 is provided with a chamfer 36 which reduces the "height" of the swivel stud on the side which faces away from skirt 24.

Plate 22 features an accommodation groove 38 on its side facing away from skirt 24. As can be seen in particular in FIG. 6, accommodation groove 38 is coaxial with respect to a central axis C of the cover element.

Ring 40 has a generally rectangular cross-section (please see FIG. 11) and is provided with two connecting lugs 42 which are each provided with an opening 44. The inner edge of ring 40 on the side facing away from connecting lugs 42 is provided with a smooth, rounded contour (please see in particular FIG. 11). The inner diameter of ring 40 corresponds to the diameter of groove 32, while the height of the ring corresponds to the width of groove 32. Further, the diameter of openings 44 in connecting lugs 42 of ring 40 corresponds to the diameter of swivel studs 34 of cover element 20.

Figure 19:
FIG. 19 shows a rolling element used in the liner of FIG. 2 in a first side view.
Figure 20:
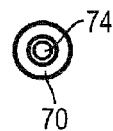
FIG. 20 shows the rolling element of FIG. 19 in a second side view.
Figure 21:
FIG. 21 shows the rolling element in a perspective view.

Holding element 50 is formed from a plate-like base 52 from which four support blocks 54 extend. Each support block 54 is provided with two recesses 56 which are arranged such that they lie opposite each other in pairs. Between adjacent support blocks 54, an accommodation space 58 for rolling elements 70 (please see FIGS. 19 to 21) is formed.

Base 52 is provided with four positioning projections 60 which are equally spaced from each other. The width of each positioning projection 60 corresponds to the width of slots 28 in cover element 20. Furthermore, the contour of the positioning projections 60 on their side facing away from supporting blocks 54 is rounded in the same way the enlarged rim portion 60 is shaped.

Figure 25:
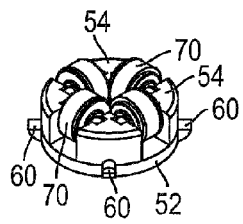
FIG. 25 shows the holding element equipped with four rolling elements in a perspective view.
Figure 26:
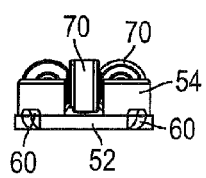
FIG. 26 shows the holding element of FIG. 25 in a side view.
Figure 27:
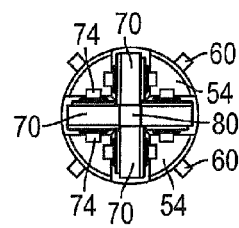
FIG. 27 shows the holding element of FIG. 25 in a top view.
Figure 30:
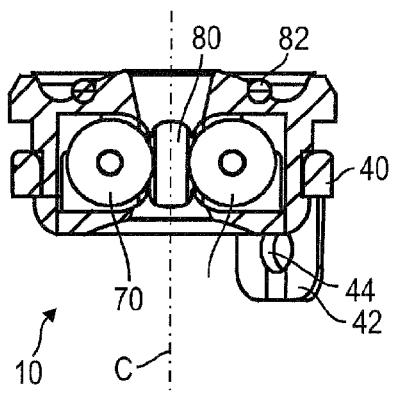
FIG. 30 shows the guiding body of FIG. 29 in a sectional view.
Figure 29:
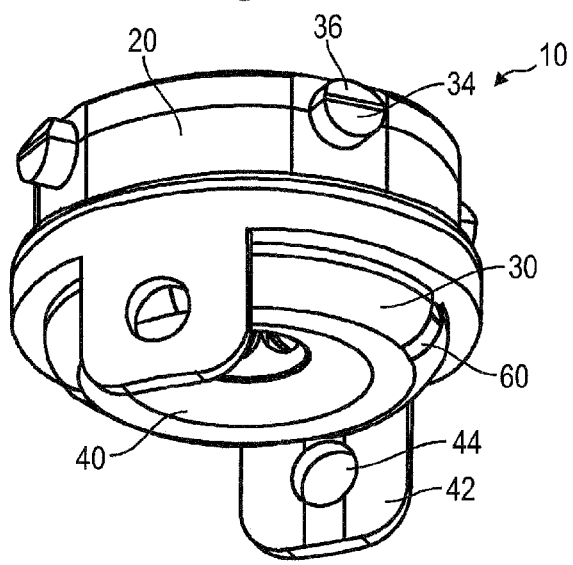
FIG. 29 shows the cover element of FIG. 28 assembled with the holding element of FIG. 25.

Cover element 20, ring 40 and holding element 50 are formed from a plastic material, in particular from polyamide. Rolling element 70 can also be formed from plastic. In the alternative, they can be formed from metal. For mounting the rolling elements in holding element 50, short bearing pins 72 (please see FIGS. 25 and 27) are used which extend through a central hole 74 of the respective rolling element 70. The bearing pins 72 each rest in one of the accommodation spaces 58 in support blocks 54 such that the rolling elements together form a closed guiding channel 80 for the welding wire as the rolling elements almost touch each other.

Figure 28:
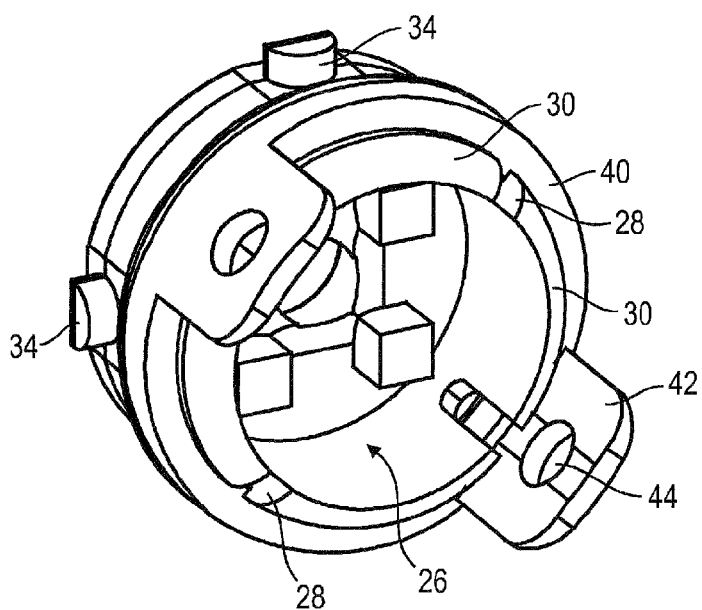
FIG. 28 shows the cover element equipped with the ring in a perspective view.

For assembling the wire guiding liner, a first step consists in placing ring 40 in groove 32 of cover element 20. To this end, the ring is simply pushed onto the skirt which elastically yields inwardly so that the ring can be pushed over rim portion 30. This is facilitated by the smooth, rounded contour of the outer edge of the rim portion and the respective edge of the ring. As soon as the ring is situated in the groove, the four sections of the skirt snap back into their original position so that ring 40 is safely held behind rim portion 30 in groove 32 (please see FIG. 28). In this condition, connecting lugs 42 project over rim portion 30 in a direction away from plate 22.

In a second step, the holding element equipped with the rolling elements 70 is pushed into the accommodation space 26 of the cover element provided with ring 40. The positioning projections 60 of the holding element come to lie in slots 28 in skirt 24 so as to "close" the slots (please see FIG. 29). Further, the support blocks 54 and the base 52 of holding element 50 have a diameter which corresponds to the diameter of accommodation space 26. Accordingly, the holding element acts as an internal support for skirt 24 which prevents the sections of the skirt from becoming deflected inwardly. This guarantees that ring 40 cannot disengage from groove 32 in cover element 20.

Figure 22:
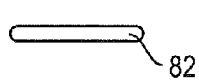
FIG. 22 shows an elastic ring used in the liner of FIG. 2 in a side view.
Figure 23:
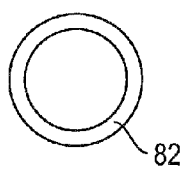
FIG. 23 shows the ring of FIG. 22 in a top view.
Figure 24:
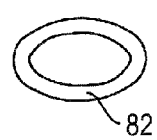
FIG. 24 shows the ring in a perspective view.

In a next step, an elastic ring 82 (please see FIGS. 22 to 24) is placed in accommodation groove 38 of holding element 20.

In a last assembly step, connecting lugs 42 of one of the so assembled guiding bodies is pushed over the swivel studs 34 of another guiding body. This is facilitated by the chamfers 36 provided on swivel studs 34. As soon as swivel studs 34 are positioned within openings 44 in connecting lugs 42 of ring 40, the connecting lugs return into their original position so that a swivel joint is formed from the swivel studs 34 engaging into openings 44. In this condition, elastic ring 82 of a "lower" guiding body 10 is held compressed against the "lower" abutment surface of the "upper" guiding body connected to the "lower" guiding body (please see FIG. 3). Furthermore, the "lower" guiding body 10 holds holding element 50 of the "upper" guiding body 10 in place in accommodation space 26 of cover element 20 of the "upper" guiding body 10. As the lower abutment surface of each holding element 50 is formed curved, a smooth swivel movement of the guiding bodies with respect to each other is possible, while a continuous, biasing contact between the elastic ring 82 and the respective surfaced is maintained. Elastic ring 82 both biases the wire guiding liner in a longitudinal direction and seals the guiding channel 80 in the interior from external contaminations. As ring 40 can freely turn in groove 32 of the respective guiding body, the two ends of a liner formed from a plurality of interconnected guiding bodies can be turned with respect to each other without the risk that a tensional load is being built up in the liner. In this regard, the ring serves for several purposes. First, it is part of the swivel joint which allows a swiveling movement of the respective bodies with respect to each other. Second, it allows the guiding bodies to rotate with respect to each other. Still further, the rings holds adjacent guiding bodies connected to each other while at the same time locking the holding element 50 in the interior of the respective cover element 20.

It should be clear that only two of the four swivel studs 34 of a cover element 20 are required for forming the liner. The two "unused" swivel studs 34 at the first and last guiding body 10, respectively, of the liner can be used for connecting the liner to termination 8.

Since the rolling elements 70, as viewed in a longitudinal direction, are arranged close to each other while the degree of swivel movement between adjacent guiding bodies is limited, the welding wire can easily be fed through the wire guiding liner even when it is held in a curved condition. The welding wire can travel through the liner in both directions.

Even though the skirt is shown as circular, it could also have a polygonal contour. Vice versa, the ring could also have a polygonal contour while the skirt is formed with a round contour. In any case, it must be ensured that the ring can smoothly rotate on the respective guiding body.

In practice, the guiding liner can be employed in a length of several dozen meters. The actual length can easily be adapted to the particular requirements by assembling the required number of guiding bodies. If desired, an outer protective hose can be employed, which could be formed from rubber, a plastics material or aramid fibers.

The invention claimed is:

1. Welding wire guiding liner, having a plurality of like guiding bodies directly connected to each other, each of the guiding bodies containing a plurality of rolling elements defining a guiding channel for the welding wire, each guiding body having a ring which is coaxial with the guiding channel and is freely rotatable in a peripheral direction on the body, the ring being connected to the adjacent guiding body by a swivel joint which allows the adjacent guiding body to swivel around a swivel axis with respect to the guiding body provided with the ring.

2. The welding wire guiding liner of claim 1 wherein the swivel joint is formed by two connecting lugs on the ring which each have an opening into which swivel studs engage which are provided on the adjacent guiding body.

3. The welding wire guiding liner of claim 1 wherein each of the guiding bodies is provided with a peripheral groove which accommodates the ring.

4. The welding wire guiding liner of claim 1 wherein each of the guiding bodies is provided with a holding element which accommodates the rolling elements, and a cover element in the interior of which the holding element is placed.

5. The welding wire guiding liner of claim 4 wherein the cover element has a skirt which is provided with a plurality of slots extending in parallel with the guiding channel in the interior of the guiding body, and an enlarged rim portion behind which the ring is placed.

6. The welding wire guiding liner of claim 5 wherein the holding element is placed within the skirt so as to support the skirt in a radial direction.

7. The welding wire guiding liner of claim 1 wherein an elastic ring is provided between adjacent guiding bodies.

8. The welding wire guiding liner of claim 1 wherein each guiding body is provided with an accommodation groove for the elastic ring at one end face and an abutment surface at the opposite end face.

9. The welding wire guiding liner of claim 1 wherein an outer protective hose is provided which is made from a flexible material selected from a group consisting of rubber, EPDM, silicon, cloth, polyamide, and aramid fibers.

* * * * *